United States Patent [19]

Minoura

[11] Patent Number: 5,483,299
[45] Date of Patent: Jan. 9, 1996

[54] IMAGE DISPLAYING APPARATUS WITH IMAGE DISPLAYING FUNCTION

[75] Inventor: Nobuo Minoura, Yokohama, Japan

[73] Assignee: Canon Kabushiki Kaisha, Tokyo, Japan

[21] Appl. No.: 201,137

[22] Filed: Feb. 24, 1994

Related U.S. Application Data

[63] Continuation of Ser. No. 60,688, May 10, 1993, abandoned, which is a continuation of Ser. No. 687,226, Apr. 18, 1991, abandoned.

[30] Foreign Application Priority Data

| May 8, 1990 | [JP] | Japan | 2-116728 |
| Jul. 3, 1990 | [JP] | Japan | 2-17442 |
| Nov. 19, 1990 | [JP] | Japan | 2-313597 |

[51] Int. Cl.⁶ .................................................. H04N 5/74
[52] U.S. Cl. ........................ 348/745; 348/191; 348/747
[58] Field of Search ............................ ; 348/744, 745, 348/747, 227, 224, 228, 746, 177, 189, 190, 191, 366; 353/101, 121; H04N 5/74

[56] References Cited

U.S. PATENT DOCUMENTS

| 3,560,647 | 2/1971 | Harmon | 353/101 |
| 4,085,425 | 4/1978 | Hamill | 358/237 |
| 4,159,484 | 6/1979 | Strathman | 358/67 |
| 4,396,944 | 8/1983 | McKenney et al. | 358/107 |
| 4,417,149 | 11/1983 | Takeuchi et al. | 356/237 |
| 4,695,893 | 9/1987 | Makino et al. | 358/227 |
| 4,868,668 | 9/1989 | Tavernetti | 358/231 |
| 4,870,331 | 9/1989 | Heinzerling | 347/747 |
| 4,912,567 | 3/1990 | Nakajima et al. | 358/227 |
| 4,917,488 | 4/1990 | Glass | 348/191 |
| 4,955,680 | 9/1990 | Froese-Peeck et al. | 358/218 |
| 5,020,116 | 5/1991 | Macaulay | 348/191 |
| 5,097,324 | 3/1992 | Tanaka et al. | 358/60 |
| 5,111,284 | 5/1992 | Tsujihara et al. | 348/747 |
| 5,136,390 | 8/1992 | Inova et al. | 358/60 |
| 5,287,173 | 2/1994 | Onuma et al. | 348/744 |
| 5,315,378 | 5/1994 | Satou et al. | 348/745 |
| 5,345,262 | 9/1994 | Yee et al. | 348/745 |

FOREIGN PATENT DOCUMENTS

| 0454451 | 10/1991 | European Pat. Off. | H04N 5/74 |
| 3311971 | 4/1984 | Germany . | |
| 1259148 | 5/1972 | United Kingdom . | |

Primary Examiner—James J. Groody
Assistant Examiner—Jeffrey S. Murrell
Attorney, Agent, or Firm—Morgan & Finnegan

[57] ABSTRACT

The television apparatus of the present invention is an apparatus which displays an image corresponding to the television signal, is so arranged that the picture quality of an image signal can be adjusted according to the projection condition of the image when the image corresponding to the image signal is projected, so that the optimum image may be projected.

26 Claims, 3 Drawing Sheets

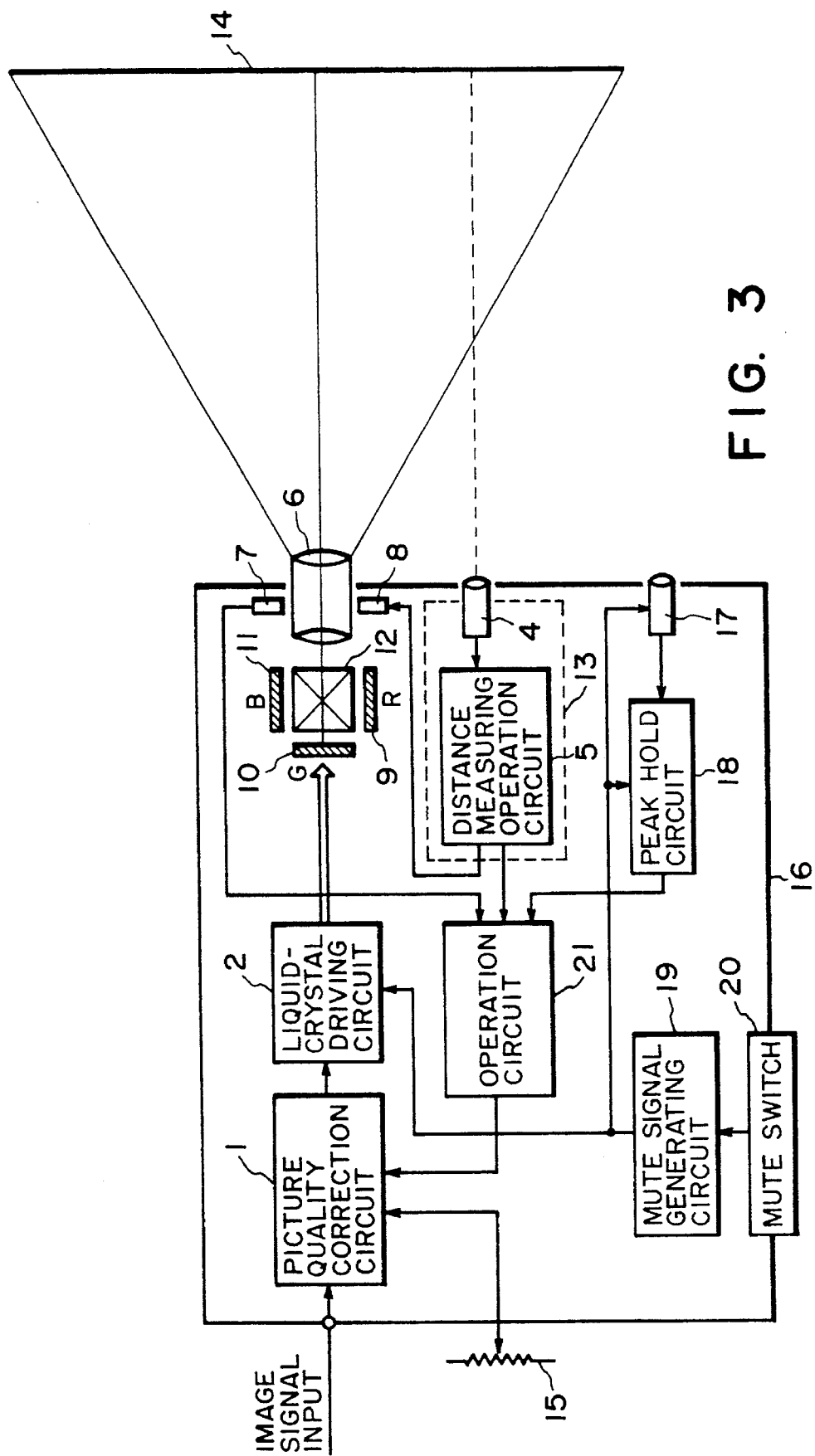

IMAGE DISPLAYING APPARATUS WITH IMAGE DISPLAYING FUNCTION

This is a continuation of application Ser. No. 08/060,688, filed on May 10, 1993, which is a continuation of application Ser. No. 07/687,226, filed on Apr. 18, 1991 both now abandoned.

BACKGROUND OF THE INVENTION

1. Field of the Invention

The present invention relates to a television apparatus which displays the image corresponding to the television signal.

2. Related Background Art

In the conventional projection type television apparatus, the projection device comprises cathode ray tube and the equipment itself is large in size. The projected image size was usually changed over to "50", "70" and "100" inch size and the size of projected image had no need to be changed once it was set. Accordingly, the manual type image quality adjustment system was adopted as in the case of ordinary television sets. In the same way, the focus adjustment was carried out by hand.

As explained above, the image quality adjustment and focus adjustment are made by hand in the conventional television apparatus. Hence, when the signal receiving place is moved or the set position is moved to modify the magnifying size of the projected picture by use of the projection lens, the optimum focus or picture quality adjustment has to be made manually.

SUMMARY OF THE INVENTION

The present invention aims to offer such a television apparatus as can solve the above problems.

The other purpose of this invention is to offer such a television apparatus as can freely project the image without influencing the quality of the picture to be projected.

In order to achieve such objectives under the present invention as one of the embodiments of the present invention, there is provided a television apparatus which displays an image corresponding to the television signal, comprising image projection means for receiving an input image signal and projecting a picture corresponding to the input image signal, and picture quality adjustment means for adjusting the picture quality of the image signal received at the image projection means.

Another objective of this invention is to offer such a television apparatus as can freely select the set position of the apparatus without influencing the quality of picture to be projected.

In order to achieve such objectives under the present invention, as one of the embodiments of the present invention, there is provided a television apparatus which displays an image corresponding to the television signal, comprising image projection means for receiving an input image signal and projecting an image corresponding to the input image signal, and picture quality adjustment means for adjusting the picture quality of the image signal received at the image projection means in response to the distance to the projection screen on which the image is projected by the image projection means.

Another objective of this invention is to offer a television apparatus which can freely select the size of the image to be projected, without influencing the quality of the image to be projected.

In order to achieve such objectives under the present invention, as one of the embodiments of the present invention, there is provided a television apparatus which displays such an image corresponding to the television signal, comprising image projection means for receiving an input image signal and projecting a picture corresponding to the input image signal to any arbitrary size, and image quality adjustment means for adjusting the picture quality of the image signal received at the image projection means in response to the size of the picture to be projected by the image projection means.

Another objective of this invention is to offer a television apparatus, which can adjust the quality of an image to be projected to the optimum degree.

In order to achieve such objectives under the present invention, as one embodiment of the present invention, there is provided a television apparatus which displays an image corresponding to the television signal, comprising picture projection means for receiving an input image signal and projecting a picture corresponding to the input image signal, and picture quality adjustment means for adjusting the picture quality of the image signal received at the image projection means in response to the luminance of the projected image face to be projected by the image projection means.

There are objectives of the present invention other than those explained above and their characteristics shall be clarified by the detailed explanation about the forms of this invention in reference to the drawings as follows.

BRIEF DESCRIPTION OF THE DRAWINGS

FIG. 3 shows the constitution of projection type television apparatus as another embodiment of the present invention.

BRIEF DESCRIPTION OF THE PREFERRED EMBODIMENTS

The present invention is explained below in reference to the embodiment of the present invention.

Figure 1:
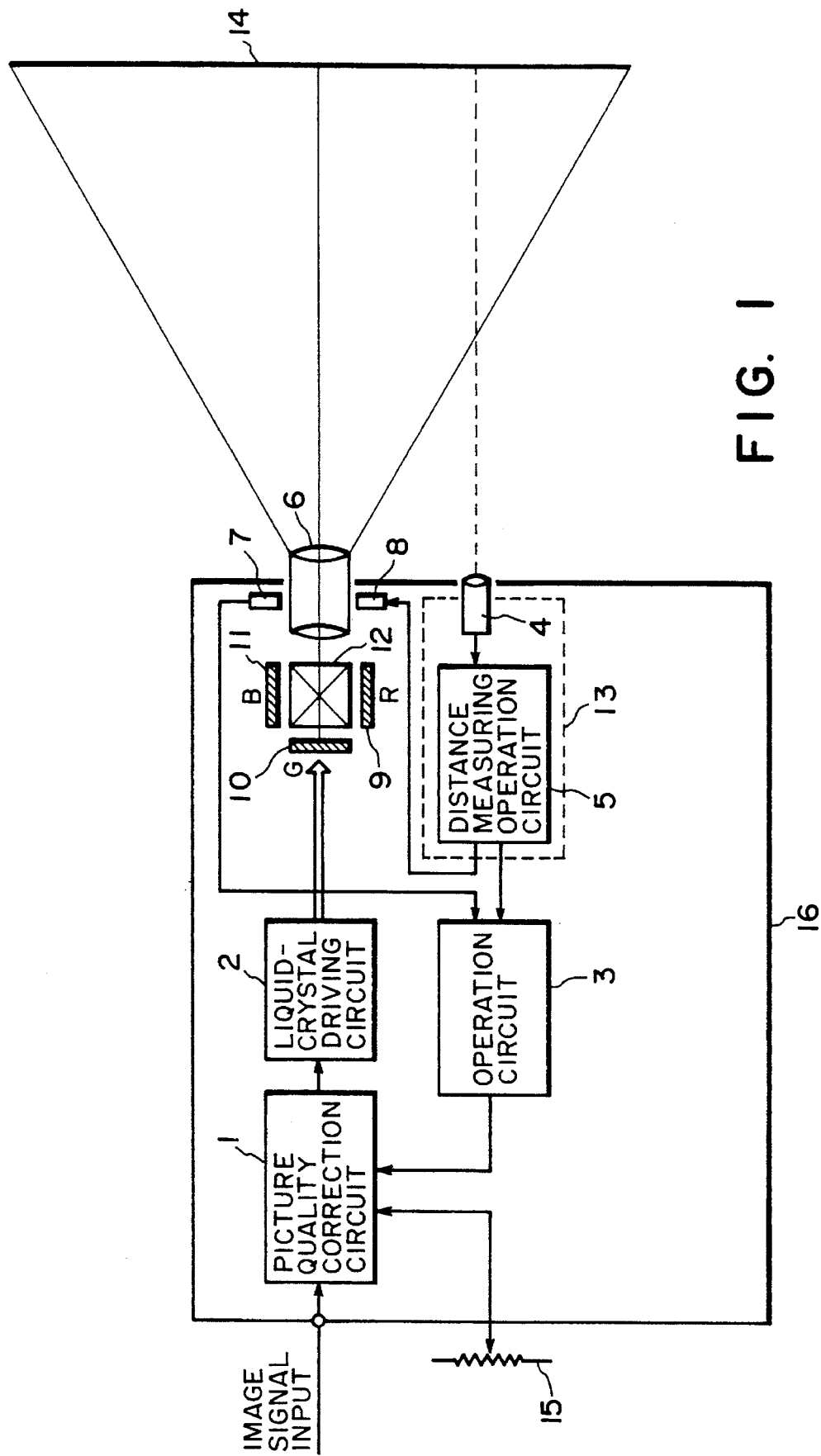
FIG. 1 shows the sketch of the constitution of a projection type television apparatus as one embodiment of the present invention.

FIG. 1 shows the outline of the constitution of a projection type television apparatus 16 as one embodiment of the present invention. In FIG. 1, 1 shows the picture quality correction circuit, being provided with the contrast adjustment function, etc. 2 shows the liquid crystal driving circuit. 3 is the operation circuit which computes the size of the projected picture. 4 represents the infrared ray transmitting and receiving unit. 5 is the distance measuring operation circuit to the screen on basis of the transmitting and receiving result from the above infrared ray transmitting and receiving unit 4. The distance measuring system 13 comprises the infrared transmitting and receiving unit 4 and the distance measuring operation circuit 5. 6 is the projection optical system made of the zoom lenses. 7 is the multiple change amount detection sensor which detects the multiple change lens in the projection optical system 6. 8 is the lens drive mechanism for the purpose of focus adjustment in the optical system 6. 9 is the red signal driving liquid crystal element. 10 is the green signal driving liquid crystal element. 11 is the blue signal driving liquid crystal element. 12 is the cross dichro-prism. 14 is the screen. 15 is the external picture quality adjustment variable resistor.

In FIG. 1, the input image signal is subjected to the picture quality correction at the picture quality correction circuit 1 which is initially set at the standard picture quality level. Thereafter, it is supplied to the liquid crystal driving circuit 2. In this liquid crystal driving circuit 2, the image signal, which is subjected to the picture quality correction at the above picture quality correction circuit 1, is divided into R (red) component, G (green) component and B (Blue) component. Based on the respective component signals, the driving signals are formed to drive the red signal driving liquid crystal element 9, green signal driving liquid crystal element 10, and blue signal driving liquid crystal element 11. The driving signals are supplied to the liquid crystal elements 9, 10 and 11 in order to drive the liquid crystal elements respectively.

The red component picture, green component picture and blue component picture formed at the liquid crystal elements 9, 10 and 11 respectively are optically synthesized at the cross dichro-prism 12, followed by the projection to the screen 14 via projection optical system 6.

Meanwhile, during the time when the above picture projection operation is carried out, the infrared beam is transmitted from the infrared ray transmitting and receiving unit 4. At the same time, the infrared beam reflected from the screen 14 is received, and the infrared ray transmitting and receiving unit 4 detects the deviation distance of the reflected infrared beam reception position from the transmission position of the infrared beam. The information on such a deviation distance is supplied to the distance measuring operation circuit 5.

The distance measuring operation circuit 5 calculates the distance to the screen 14 and the calculated distance information is supplied to the lens driving mechanism 8 and operation circuit 3.

In the lens driving mechanism 8, the focusing lens of the optical projection system 6 is moved on the basis of the distance information provided by the distance measuring operation circuit 5. In this way, focus adjustment is made.

Meanwhile, in addition to the distance information supplied from the above distance measuring operation circuit 5, the operation circuit 3 receives the position information of the multiple change lens detected at the multiple change amount detection sensor 7. The above operation circuit 3 calculates the size of the projected picture on the screen 14 from the supplied distance information, position information, multiple change ratio, the size of liquid crystal elements 9, 10 and 11, etc. The operation circuit 3 sends such a control signal to the picture quality correction circuit 1 as corresponds to the projected image plane size.

Figure 2:
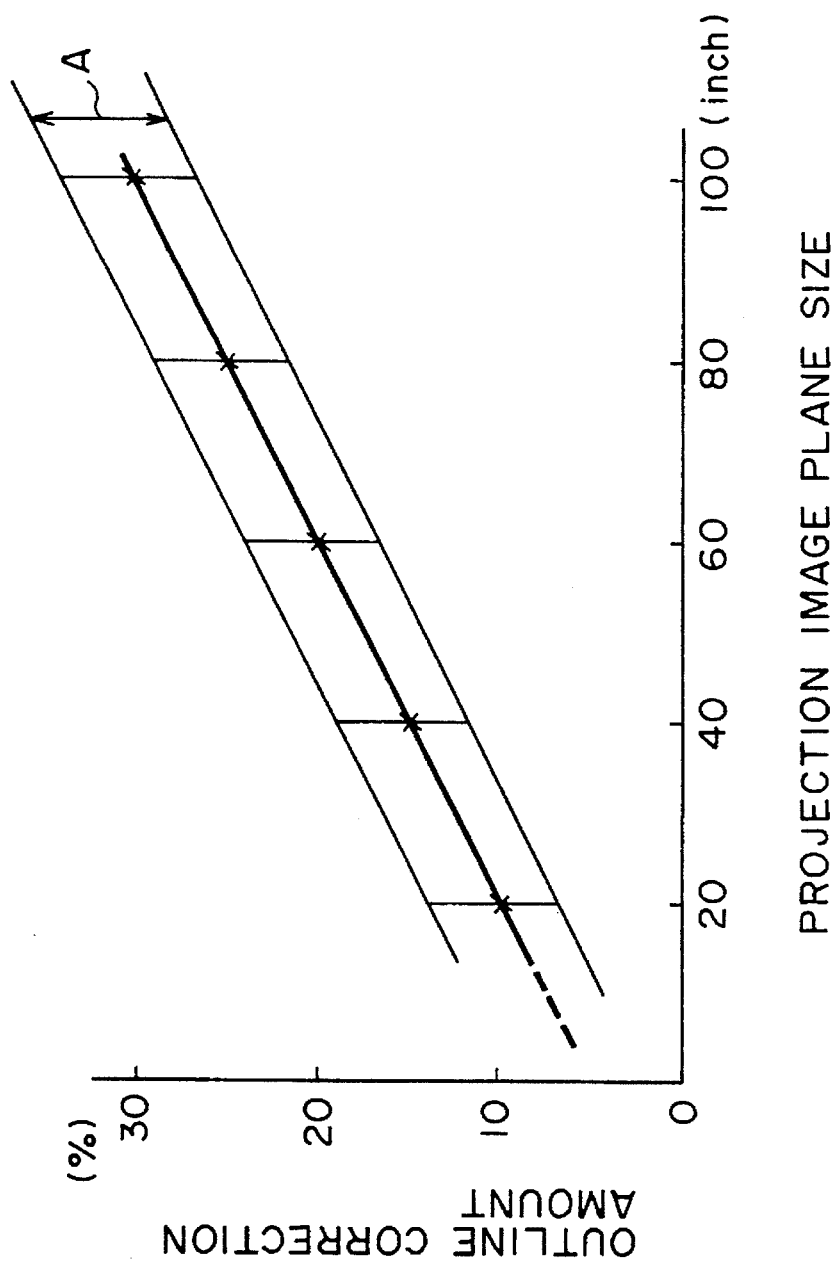
FIG. 2 shows the example of characteristic of the outline emphasis connection which is undertaken in the apparatus of FIG. 1.

In the picture quality correction circuit 1, the outline emphasis is applied to the input image signal in reference to the control signal supplied by the above operation circuit 3, for example, to the size of projected picture as shown in FIG. 2.

In FIG. 1, the external picture quality adjustment variable resistor 15 does not make the automatic correction of picture quality as depicted above but carries out such picture quality adjustments like the outline correction as suit to the liking of a user, and the adjustable range is shown with "A" in FIG. 2.

In the embodiment shown in FIG. 1, the infrared ray is used for the measurement of distance. In this invention, however, it is further possible to use other systems like an ultrasonic system.

The following explanation covers another embodiment of the present invention.

FIG. 3 shows the simplified constitution of projection type television device representing another embodiment of the present invention.

In FIG. 3, 17 shows the photo-sensor. 18 means the peak hold circuit. 19 is the mute signal generating circuit. 20 shows the external mute switch. 21 is the operation circuit. In FIG. 3, the same numbering system is adopted as in the above FIG. 1 for the corresponding components, and detail explanation is omitted.

The device shown in FIG. 3 not only detects the size of projected image picture but also detects the condition of light from outside by means of the photo-sensor 17. In order to give the optimum luminance contrast and outline correction to the picture to be projected, the condition of light from outside is detected by means of the photo-sensor 17 in addition to the detection of the projected picture and the optimum picture quality adjustment is conducted in reference to both conditions.

In FIG. 3, in order to set the optimum luminance contrast level, the external mute switch 20 is operated. Then, the mute signal generating circuit 19 supplies the mute signal, which is to mute the projected picture for a preset time, to the liquid crystal drive circuit 2, photo-sensor 17 and peak hold circuit 18. During the time when the above mute signal is supplied, the liquid crystal driving circuit 2 puts the liquid crystal elements 9, 10 and 11 into the closed mode (shading condition) and interrupts the projection of image. Meanwhile, the photo-sensor 17 measures the value of luminance level on the screen 14 by the light from outside and the peak hold circuit 18 supplies the information on the maximum luminance value to the operation circuit 21.

In the operation circuit 21, like the embodiment shown in FIG. 1, in addition to the outline correction in reference to the size of projected picture, the picture quality correction circuit 1 is provided in order to make the luminance contrast adjustment in reference to the maximum luminance value information on the screen 14 to be supplied from the above peak hold circuit 18. When the mute signal generation from the mute signal generating circuit 19 is finished, the picture quality circuit 1 makes the picture quality correction on the basis of the outline correction and luminance contrast adjustment as explained above by the operation of circuit 21, and the projection is made on the screen 14.

In the embodiment of FIG. 3, it is so arranged that, by operating the mute switch 20, the projected picture is muted and the value of luminance level on the screen 14 by the light from outside is measured so that the luminance contrast adjustment may be set. However, if it is, for example, so arranged that the above picture quality adjustment may be made during the set time after the power supply source to the device is put on and the projected picture is muted accordingly. Then, the picture quality adjustment can be carried out automatically without resorting to the maneuvering of mute switch 20. In this way, the device is easier to use.

As explained above, by applying the present invention, the installation place of the device and size of projected picture can be freely changed without influencing the quality of the projected picture.

Since it is so arranged that the quality adjustment of the projected picture can be made automatically, even a beginner can have the optimum quality adjustment of the projected picture and accordingly the device can be utilized most easily.

What is claimed is:

1. An image display apparatus for displaying an image corresponding to an image signal comprising:

(a) image projecting means for receiving the image signal and projecting the image corresponding to the received image signal onto a screen;

(b) distance detecting means for detecting the distance from said image projecting screen; and (c) image signal adjusting means adjusting said image signal applied to said image projecting means, according to the distance from said image projecting means to said screen, which is detected by said distance detecting means.

2. An image display apparatus for displaying an image corresponding to an image signal, comprising:

(a) image projecting means for receiving the image signal and projecting the image corresponding to the received image signal onto a screen; and (b) image signal adjusting means for adjusting the image applied to said image signal projecting means, according to the distance from said image projecting means to said screen.

3. An apparatus according to claim 2, wherein said image projecting means includes distance detecting means for detecting the distance from said image projecting means to said screen.

4. An apparatus according to claim 3, wherein said image signal adjusting means is arranged to adjust the image signal applied to said image projecting means, according to the distance from said image projection means to said screen.

5. An apparatus according to claim 2, wherein said image signal adjusting means includes:

(a) distance detecting means for detecting the distance from said image projecting means to said screen and generating a distance information signal indicative of said detected distance; and (b) outline emphasis processing means for emphasizing a portion of the image signal applied to said image signal projecting means, according to said distance information signal generated by said distance detecting means, said portion of the image signal corresponding to an outline section of the image.

6. An apparatus according to claim 2, wherein said image signal adjusting means is arranged so that said image signal applied to said image signal projecting means can be adjusted independently of the distance from said image projecting means to said screen.

7. An apparatus according to claim 2, wherein said image projecting means includes:

(a) image forming means for forming an image corresponding to the received image signal; and (b) optical projecting means for projecting the image formed by said image forming means onto said screen.

8. An apparatus according to claim 7, wherein said image signal adjusting means includes:

(a) distance detecting means for detecting the distance from said image projecting means to said screen, controlling a focusing action of said optical projecting means according to the distance detected and generating a distance information signal indicative of the detected distance; and (b) outline emphasis processing means for emphasizing a portion of the image signal applied to said image signal projecting means, according to said distance information signal generated by said distance detection means, said portion of the image signal corresponding to an outline section of the image.

9. An image display apparatus for displaying an image corresponding to an image signal, comprising:

(a) image projecting means for receiving the image signal and projecting the image corresponding to the received image signal onto a screen with a desired size of the image; and (b) image signal adjusting means for adjusting the image signal applied to said image projecting means, according to the size of the image projected onto the screen by said image projecting means.

10. An apparatus according to claim 9, wherein said image projecting means includes image size setting means for setting a size of the image projected onto said screen by said image projecting means.

11. An apparatus according to claim 10, wherein said image signal adjusting means is so arranged to adjust the image signal applied to said image projecting means, according to the size of the image set by said image size setting means.

12. An apparatus according to claim 9, wherein said image signal adjusting means includes:

(a) image size detecting means for detecting the size of the image projected onto the screen by said image projecting means and for generating an image size information signal indicative of the detected size of the image; and (b) outline emphasis processing means for emphasizing a portion of the image signal applied to said image projecting means, according to said image size information signal generated by image size detecting means, said portion of the image signal corresponding to an outline section of the image.

13. An apparatus according to claim 9, wherein said image signal adjusting means is so arranged that said image signal applied to said image projecting means can be adjusted independently of the size of the image projected onto the screen by said image projecting means.

14. An apparatus according to claim 9, wherein said image projecting means includes:

(a) image forming means for forming the image corresponding to the receiving image signal; and (b) optical projecting means for projecting the image formed by said image forming means, with a desired size.

15. An image display apparatus for displaying an image corresponding to an image signal comprising:

(a) image forming means for receiving the image signal and forming the image corresponding to the received image signal;

(b) optical projecting means for projecting the image formed by said image forming means, onto a screen with a desired size of the image;

(c) distance detecting means for detecting the distance from said image projecting means to the screen, controlling a focusing action of said optical projecting means according to the detected distance and generating a distance information signal indicative of the detected distance;

(d) magnification ratio detecting means for detecting a magnification ratio of the image projected onto the screen by said optical projecting means and generating a magnification ratio information signal indicative of the detected magnification ratio of the image; and (e) outline emphasis processing means for calculating the size of the image projected onto screen by said optical projecting means, according to said distance information signal generated by said distance detecting means and said magnification ratio information signal generated by said magnification ratio detecting means and for emphasizing a portion of the image signal applied to said image forming means, according to the result of the calculation, said portion of the image signal corresponding to an outline section of the image.

16. An image display apparatus for displaying an image corresponding to an image signal, comprising;

(a) instructing means for instructing interruption of an image projecting operation;

(b) image projecting means for receiving the image signal and interrupting the image projecting operation in which the image corresponding to the received image signal is projected onto a screen, while said instructing means instructs the interruption of the image projecting operation; and (c) image signal adjusting means for adjusting said image signal applied to said image projecting means, according to the brightness of the image projected onto the screen by said image projecting means while said instructing means instructs the interruption of the image projecting operation.

17. An apparatus according to claim 16, wherein said instructing means is so arranged to instruct the interruption of the image projecting operation of said image projecting means during a predetermined time after said image display apparatus is activated.

18. An image display apparatus for displaying an image corresponding to an image signal, comprising:

(a) image projecting means for receiving the image signal and projecting the image corresponding to the received image signal onto a screen;

(b) image signal adjusting means for adjusting the image signal applied to said image projecting means, according to brightness information from the screen; and (c) instructing means for instructing said image signal adjusting means to start an adjusting operation of the image signal applied to said image projecting means, wherein said instructing means is so arranged that said image projecting means interrupts the image projecting operation during at least a portion of said adjusting operation.

19. An apparatus according to claim 18, wherein said image projecting means includes brightness detecting means for detecting the brightness on the screen.

20. An apparatus according to claim 19, wherein said image signal adjusting means is so arranged to adjust the image signal applied to said image projecting means, according to the brightness of the image detected by said brightness detecting means.

21. An apparatus according to claim 18, wherein said image signal adjusting means includes:

(a) brightness detecting means for detecting the brightness on the screen and for generating a brightness information signal indicative of the detected brightness; and (b) contrast adjusting means for adjusting contrast of the image corresponding to the image signal applied to said image signal projecting means, according to said brightness information signal generated by said brightness detecting means.

22. An apparatus according to claim 18, wherein said image signal adjusting means is arranged so that the image signal applied to said image projecting means can be adjusted independently of the brightness on the screen.

23. An apparatus according to claim 18, wherein said instructing means is so arranged to instruct said image signal adjusting means to start the adjusting operation during a predetermined time after said image display apparatus is activated.

24. An apparatus according to claim 18, wherein said image projecting means includes:

(a) image forming means for forming the image corresponding to the received image signal; and (b) optical projecting means for projecting the image formed by said forming means onto the screen with a desired size.

25. An apparatus according to claim 24, wherein said image signal adjusting means includes:

(a) contrast adjusting control signal generating means for detecting the brightness of the image projected onto the screen by said image projecting means and for generating a contrast adjusting control signal according to the detected brightness; and (b) contrast adjusting means for adjusting the contrast of the image formed by said image forming means, according to said contrast adjusting control signal generated by said contrast adjusting control signal generating means.

26. An image display apparatus for displaying an image corresponding to an image signal, comprising:

(a) image forming means for receiving the image signal and forming the image corresponding to the received image signal;

(b) optical projecting means for projecting the image formed by said image forming means onto a screen with a desired size;

(c) brightness detecting means for detecting the brightness of the image projected onto the screen by said optical projecting means and for generating a brightness information signal indicative of the detected brightness;

(d) distance detecting means for detecting the distance from said optical projecting means to the screen, controlling a focusing action of said optical projecting means according to the detected distance and generating a distance information signal indicative of the detected distance;

(e) magnification ratio detecting means for detecting a magnification ratio of the image projected onto the screen by said optical projecting means and for generating a magnification ratio information signal indicative of the detected magnification ratio;

(f) adjusting control signal generating means for calculating a size of the image projected onto the screen by said optical projecting means, according to said distance information signal generated by said distance detecting means and said magnification ratio information signal generated by said magnification ratio detecting means, for emphasizing a portion of the image signal applied to said image forming means, which portion corresponds to an outline section of the image, according to the result of the calculation and said brightness information signal generated by said brightness detecting means, and for generating an adjusting control signal to adjust the contrast of the image corresponding to the image signal applied to said image forming means; and (g) image adjusting processing means for adjusting the image formed by said image forming means, according to said adjusting control signal generated by said adjusting control signal generating means.

* * * * *

UNITED STATES PATENT AND TRADEMARK OFFICE
CERTIFICATE OF CORRECTION

PATENT NO. : 5,483,299
DATED : January 9, 1996
INVENTOR(S) : Nobuo Minoura

It is certified that error appears in the above-indentified patent and that said Letters Patent is hereby corrected as shown below:

On the cover page, after "[30] Foreign Application Priority Data" delete the three applications listed and insert April 27, 1990 [JP] Japan..........2-111965

Signed and Sealed this

Ninth Day of July, 1996

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,483,299
DATED : Jan. 9, 1996
INVENTOR(S) : Nobuo Minoura

It is certified that error appears in the above-indentified patent and that said Letters Patent is hereby corrected as shown below:

Column 1, line 19, insert --the-- before "projected";

Column 2, line 56, insert --the-- before "basis";

Column 5, line 17, insert --signal-- before "applied," and delete "signal" after "image"; and Column 5, line 25, insert --so-- before "arranged."

Signed and Sealed this

Seventeenth Day of September, 1996

Attest:

BRUCE LEHMAN

Attesting Officer     Commissioner of Patents and Trademarks